US012711888B2

(12) United States Patent
Tomizawa et al.

(10) Patent No.: US 12,711,888 B2
(45) Date of Patent: Aug. 18, 2026

(54) DISPLAY SYSTEM

(71) Applicant: Japan Display Inc., Tokyo (JP)

(72) Inventors: Kazunari Tomizawa, Tokyo (JP); Kentaro Okuyama, Tokyo (JP); Junji Kobashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 19/284,148

(22) Filed: Jul. 29, 2025

(65) Prior Publication Data

US 2026/0038406 A1 Feb. 5, 2026

(30) Foreign Application Priority Data

Aug. 1, 2024 (JP) ................................ 2024-126207

(51) Int. Cl.

*G09G 3/20* (2006.01)
*G09G 3/18* (2006.01)
*G09G 3/19* (2006.01)

(52) U.S. Cl.

CPC ............. *G09G 3/2003* (2013.01); *G09G 3/18* (2013.01); *G09G 3/19* (2013.01); *G09G 2320/0276* (2013.01); *G09G 2320/0646* (2013.01); *G09G 2360/144* (2013.01)

(58) Field of Classification Search

CPC .......... G09G 3/2003; G09G 3/18; G09G 3/19; G09G 3/36; G09G 3/3648; G09G 2320/0276; G09G 2320/0646; G09G 2360/144

See application file for complete search history.

(56) References Cited

U.S. PATENT DOCUMENTS

| | | | | |
|---|---|---|---|---|
| 10,249,251 | B2 * | 4/2019 | Yata | G09G 5/10 |
| 11,335,277 | B2 * | 5/2022 | Wen | G09G 5/10 |
| 11,699,368 | B1 * | 7/2023 | Chang | B60K 35/90<br>345/207 |
| 11,948,522 | B2 * | 4/2024 | Sako | G09G 3/36 |
| 2007/0070007 | A1 * | 3/2007 | Imai | G09G 3/3611<br>345/89 |
| 2008/0158137 | A1 * | 7/2008 | Yoshida | G09G 3/3648<br>250/214 A |

(Continued)

FOREIGN PATENT DOCUMENTS

JP 2020-160254 A 10/2020

*Primary Examiner* — Vinh T Lam
(74) *Attorney, Agent, or Firm* — K&L Gates LLP

(57) ABSTRACT

According to an aspect, a display system includes: a display panel having a display area provided with pixels and configured to allow a user to visually recognize a background transmitted through the display area; a light source configured to emit light toward a side surface of the display panel; a signal processing circuit configured to generate input gradation values and output either first gradation values that are the input gradation values or second gradation values obtained by multiplying each of the input gradation values by an adjustment coefficient of 1 or smaller corresponding to attenuation of light propagating in the display panel; an illuminance sensor; and a camera. The signal processing circuit is configured to output the first gradation values when average luminance of the background image is a first predetermined value or larger and illuminance acquired by the illuminance sensor is a second predetermined value or larger.

18 Claims, 16 Drawing Sheets

(56) References Cited

U.S. PATENT DOCUMENTS

| | | | | |
|---|---|---|---|---|
| 2009/0121987 | A1* | 5/2009 | Fukutome | G09G 3/342 345/82 |
| 2011/0254878 | A1* | 10/2011 | Mori | G09G 3/2007 345/690 |
| 2012/0169796 | A1* | 7/2012 | Kobiki | G09G 3/3611 345/690 |
| 2014/0375696 | A1* | 12/2014 | Chuang | G09G 3/3406 345/690 |
| 2015/0154919 | A1* | 6/2015 | Ooshima | G09G 3/3426 345/589 |
| 2016/0322005 | A1* | 11/2016 | Umeyama | G09G 3/3426 |
| 2017/0061903 | A1* | 3/2017 | Yata | G09G 3/3607 |
| 2018/0330681 | A1* | 11/2018 | Kurokawa | G02F 1/1339 |
| 2019/0073964 | A1* | 3/2019 | Hong | G09G 3/3426 |
| 2019/0265552 | A1* | 8/2019 | Shiomi | H04N 1/407 |
| 2020/0143770 | A1* | 5/2020 | Tai | G09G 3/3406 |
| 2020/0394982 | A1* | 12/2020 | Zhong | G09G 5/10 |
| 2021/0020140 | A1* | 1/2021 | Li | G09G 5/10 |
| 2021/0185167 | A1* | 6/2021 | Chen | G09G 3/3225 |
| 2021/0241676 | A1* | 8/2021 | Hazra | G09G 5/10 |
| 2021/0327393 | A1* | 10/2021 | Simpson | G01J 1/4204 |
| 2022/0004052 | A1 | 1/2022 | Ohue | |
| 2022/0254319 | A1* | 8/2022 | Liu | G06F 1/3265 |
| 2022/0301519 | A1* | 9/2022 | Greimel-Laengauer | G09G 3/2092 |
| 2023/0186818 | A1* | 6/2023 | Weindorf | G09G 3/2007 345/690 |
| 2024/0169949 | A1* | 5/2024 | Kobashi | G09G 3/36 |

* cited by examiner

DISPLAY SYSTEM

CROSS-REFERENCE TO RELATED APPLICATION

This application claims the benefit of priority from Japanese Patent Application No. 2024-126207 filed on Aug. 1, 2024, the entire contents of which are incorporated herein by reference.

BACKGROUND

1. Technical Field

What is disclosed herein relates to a display system.

2. Description of the Related Art

Japanese Patent Application Laid-open Publication No. 2020-160254 (JP-A-2020-160254) discloses a display device that allows a user to visually recognize, from one surface of a display panel, the background on the other surface side. The display device disclosed in JP-A-2020-160254 is what is called a transparent display and includes a display panel having a liquid crystal layer containing polymer-dispersed liquid crystal and a light source disposed facing the side surface of the display panel.

In the display device disclosed in JP-A-2020-160254, the display panel is provided with elements, such as switching elements and electrodes. Light entering from the side surface of the display panel is partially consumed when it propagates in the display panel, and the amount of light decreases as it propagates in the display panel. As a result, luminance gradient occurs in the display surface. To address this, it is conceivable to uniformize the luminance in the display surface by multiplying the gradation value of each pixel in the display surface by a coefficient corresponding to the luminance gradient. In the case, however, the luminance in the entire display surface decreases independently of input images to be displayed and surrounding conditions.

For the foregoing reasons, there is a need for a display system that can optimize uniformizing the luminance according to an input image to be displayed and surrounding conditions.

SUMMARY

According to an aspect, a display system includes: a display panel that has a display area provided with a plurality of pixels arrayed in a first direction and a second direction intersecting the first direction and is configured to allow a user to visually recognize a background transmitted through the display area; a light source configured to emit light in the second direction toward a side surface of the display panel extending in the first direction; a signal processing circuit configured to generate input gradation values corresponding to the pixels based on an image to be displayed and output either first gradation values that are the input gradation values or second gradation values obtained by multiplying each of the input gradation values by an adjustment coefficient of 1 or smaller corresponding to attenuation of light propagating in the display panel; an illuminance sensor configured to measure environmental illuminance; and a camera configured to acquire a background image transmitted through the display panel. The signal processing circuit is configured to output the first gradation values when average luminance of the background image is equal to or larger than a first predetermined value and illuminance acquired by the illuminance sensor is equal to or larger than a second predetermined value. The signal processing circuit is configured to output the second gradation values when the average luminance of the background image is smaller than the first predetermined value and the illuminance is smaller than the second predetermined value.

According to an aspect, a display system includes: a display panel that has a display area provided with a plurality of pixels arrayed in a first direction and a second direction intersecting the first direction and is provided with an electrochromic layer configured to make a background of the display area invisible; a light source configured to emit light in the second direction toward a side surface of the display panel extending in the first direction; a signal processing circuit configured to generate input gradation values corresponding to the pixels based on an image to be displayed and output either first gradation values that are the input gradation values or second gradation values obtained by multiplying each of the input gradation values by an adjustment coefficient of 1 or smaller corresponding to attenuation of light propagating in the display panel; and an illuminance sensor configured to measure environmental illuminance. The signal processing circuit is configured to output the first gradation values when the background of the display area is made visible and illuminance acquired by the illuminance sensor is equal to or larger than a second predetermined value. The signal processing circuit outputs the second gradation values when the background of the display area is made invisible by the electrochromic layer and the illuminance is smaller than the second predetermined value.

DETAILED DESCRIPTION

Figure 1:
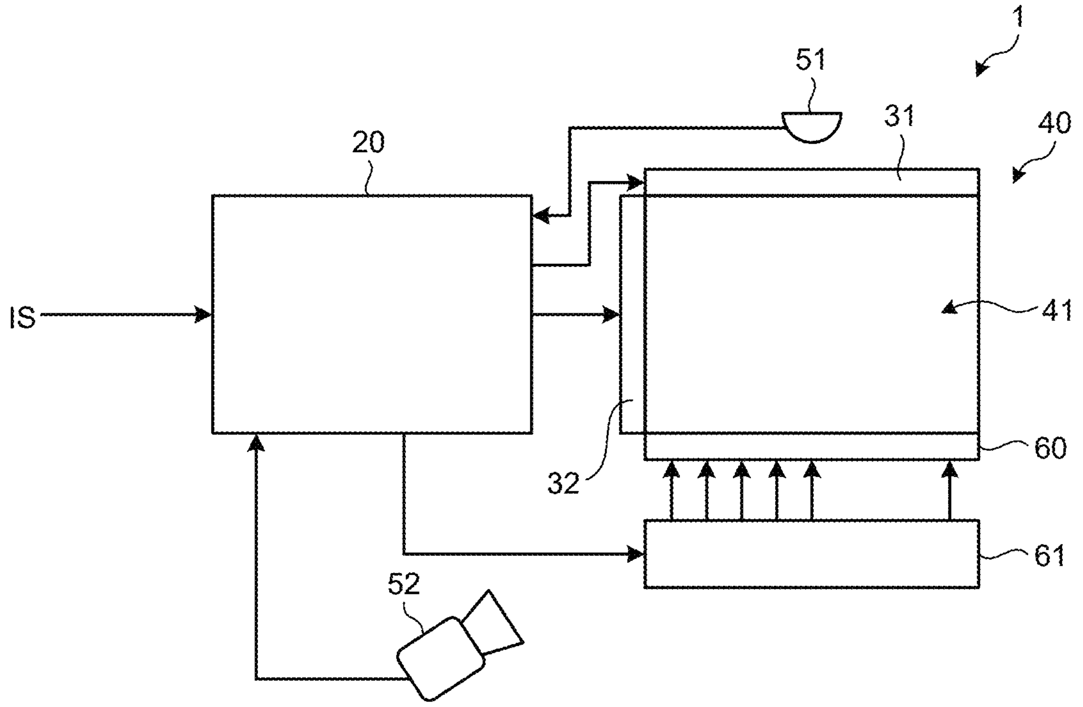
FIG. 1 is a schematic of an example of a block configuration of a display system according to a first embodiment.

The following describes modes (embodiments) for carrying out the present disclosure in detail with reference to the drawings. The present disclosure is not limited to the description of the embodiments to be given below. Components to be described below include those easily conceivable by those skilled in the art or those substantially identical thereto. In addition, the components to be described below can be combined as appropriate. What is disclosed herein is merely an example, and the present disclosure naturally encompasses appropriate modifications easily conceivable by those skilled in the art while maintaining the gist of the disclosure. To further clarify the description, the drawings schematically illustrate, for example, widths, thicknesses, and shapes of various parts as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

First Embodiment

Figure 2:
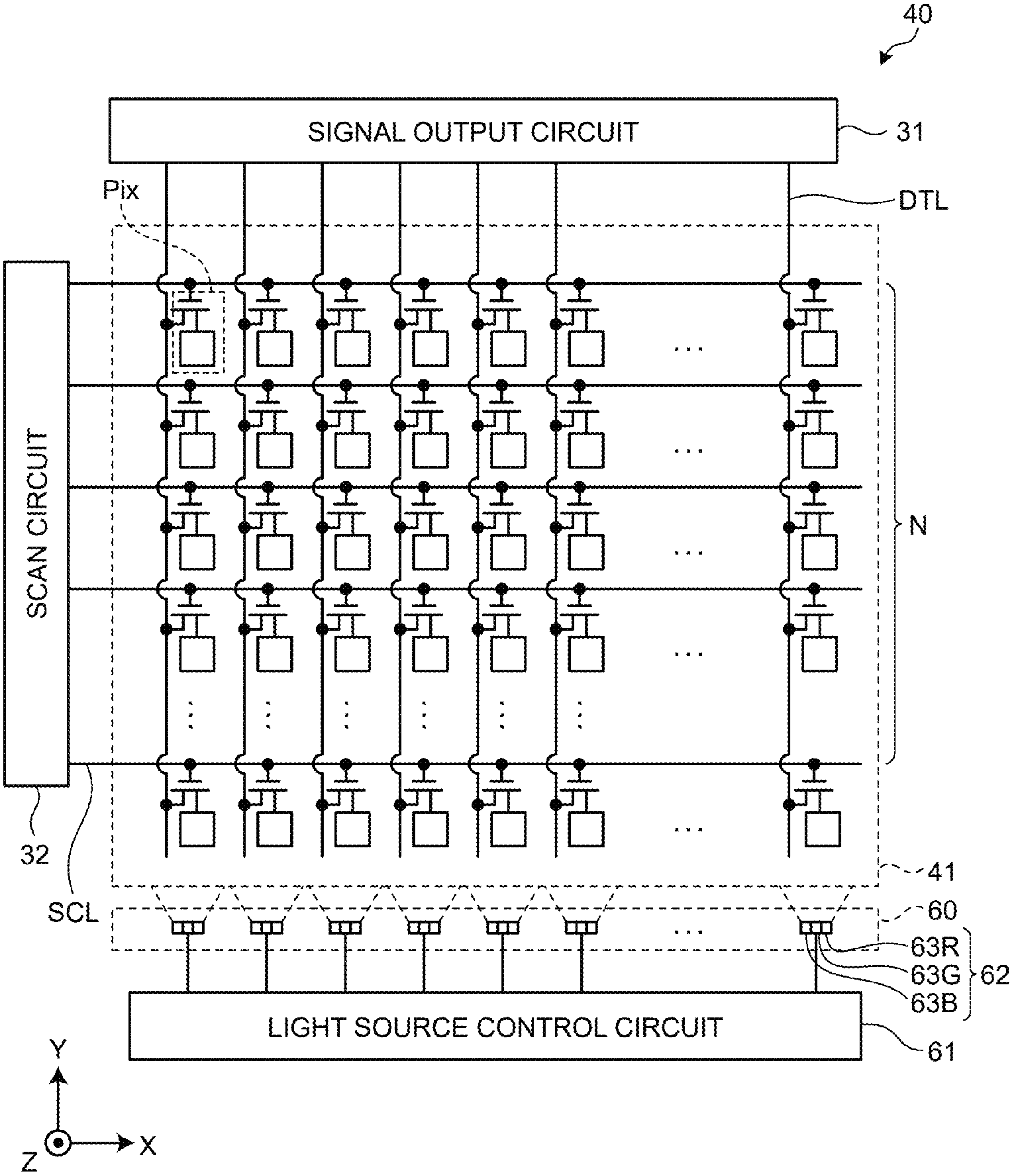
FIG. 2 is a schematic of a configuration example of a display panel according to the first embodiment.

FIG. 1 is a schematic of an example of a block configuration of a display system according to a first embodiment. FIG. 2 is a schematic of a configuration example of a display panel according to the first embodiment. A display system 1 according to the first embodiment includes a signal processing circuit 20, a display panel 40, and a light source 60 as a main block configuration. In the present disclosure, the display system 1 according to the first embodiment includes an illuminance sensor 51 that measures environmental illuminance and a camera 52 that acquires a background image transmitted through the display panel 40. The display panel 40 includes a signal output circuit 31 and a scan circuit 32. The display panel 40 according to the present disclosure is, for example, an active matrix color liquid crystal display panel driven based on what is called a field-sequential color (FSC) method.

The display panel 40 is controlled to be driven based on signals from the signal processing circuit 20. The display panel 40 according to the present disclosure is a liquid crystal display panel in which polymer-dispersed liquid crystal (PDLC) (hereinafter, also referred to simply as "liquid crystal") is sealed between substrates disposed facing each other. The light source 60 illuminates the display panel 40 from the back side. The display panel 40 displays the images using the signals from the signal processing circuit 20 and light from the light source 60.

As illustrated in FIG. 2, the display panel 40 is provided with a display area 41 in which a plurality of pixels Pix are arranged in an X-direction (first direction) and a Y-direction (second direction). The Y-direction (second direction) is a direction that intersects the X-direction (first direction). More specifically, in the example illustrated in FIG. 1, the Y-direction (second direction) is a direction orthogonal to the X-direction (first direction).

Figure 3:
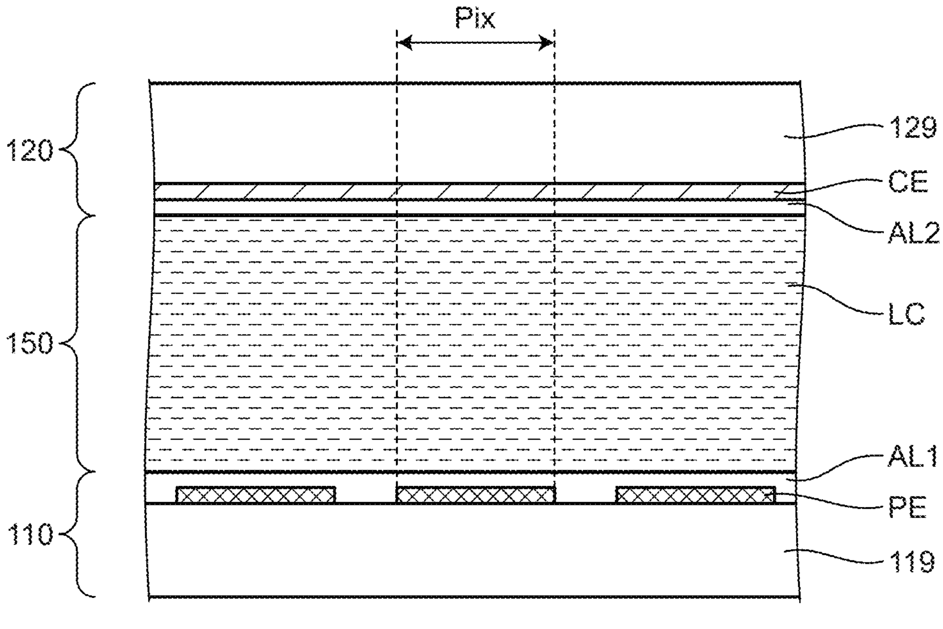
FIG. 3 is a schematic sectional view of the display panel.

FIG. 3 is a schematic sectional view of the display panel. As illustrated in FIG. 3, the display panel 40 includes an array substrate 110, a counter substrate 120, and a liquid crystal layer 150.

The array substrate 110 includes a first light-transmitting base 119 made of glass, for example. The first light-transmitting base 119 may be made of resin, such as polyethylene terephthalate, as long as it has a light-transmitting property. The first light-transmitting base 119 is provided with pixel electrodes PE. The pixel electrode PE is made of light-transmitting conductive material, such as indium tin oxide (ITO).

The counter substrate 120 includes a second light-transmitting base 129 made of glass, for example. The second light-transmitting base 129 may be made of resin, such as polyethylene terephthalate, as long as it has a light-transmitting property. The second light-transmitting base 129 is provided with a common electrode CE. The common electrode CE is made of light-transmitting conductive material, such as ITO.

The counter substrate 120 faces the array substrate 110 in a Z-direction (third direction) perpendicular to the surface of the array substrate 110. Polymer dispersed liquid crystal LC of the liquid crystal layer 150 illustrated in FIG. 3 is sealed between the array substrate 110 and the counter substrate 120.

The array substrate 110 is provided with a first orientation film AL1. The counter substrate 120 is provided with a second orientation film AL2. The orientation films are subjected to an orientation treatment such that the orientation direction of the first orientation film AL1 is aligned toward one side of the X-direction (first direction) and that the orientation direction of the second orientation film AL2 is aligned toward the other side of the X-direction (first direction), for example. The first orientation film AL and the second orientation film AL2 may be vertical orientation films, for example, or may be orientation films subjected to the orientation treatment so as to have an orientation in the X-direction (first direction) in which a plurality of light emission units 62, which will be described later, are arranged. The orientation treatment is performed by rubbing or photo-orientation.

The pixel electrodes PE are provided corresponding to the pixels Pix. Each pixel electrode PE is coupled to one of the source and the drain of the switching element of the corresponding pixel Pix. The other of the source and the drain of the switching element is coupled to a corresponding one of signal lines DTL. The gate of the switching element is coupled to a corresponding one of scan lines SCL.

The switching element is a switching element using, for example, a semiconductor, such as a thin-film transistor (TFT). The thin-film transistor may be a bottom-gate or top-gate transistor, for example. While the switching element is a single-gate thin-film transistor, for example, it may be a double-gate transistor.

The signal processing circuit 20 outputs various signals for controlling operations of the signal output circuit 31, the scan circuit 32, and a light source control circuit 61 based on input signals from the outside.

In the present disclosure, the signal processing circuit 20 generates pixel gradation values corresponding to an input image to be displayed IS (hereinafter also referred to as an "image to be displayed IS") in the display system according to the present disclosure for the respective pixels Pix in the display area 41.

The scan circuit 32 sequentially supplies drive signals to the pixels Pix arrayed in the Y-direction (second direction) via the scan lines SCL arrayed in the Y-direction (second direction). In the present disclosure, the number of the scan lines SCL is N (where N is a natural number).

The signal output circuit 31 outputs, via the signal lines DTL arrayed in the X-direction (first direction), the pixel gradation values corresponding to the pixels Pix coupled to the scan line SCL to which the drive signal is supplied from the scan circuit 32. In the present disclosure, the number of the signal lines DTL is M (where M is a natural number).

The light source 60 includes a plurality of light emission units 62. The light source 60 is coupled to the light source control circuit 61. The light source 60 is called a side light source and outputs light from the side surface of the display panel 40 extending in the X-direction (first direction). Light output from the light source 60 propagates in the Y-direction (second direction) in the display panel 40.

Each of the light emission units 62 includes a first light emitter 63R that emits light in a first color (e.g., red), a second light emitter 63G that emits light in a second color (e.g., green), and a third light emitter 63B that emits light in a third color (e.g., blue). The light emitters are light-emitting diodes (LEDs), for example, but are not limited thereto. The light emitters may be cold cathode fluorescent lamps (CCFLs), for example.

The light emitters are each coupled to the light source control circuit 61. The light source control circuit 61 controls each of the first light emitter 63R, the second light emitter 63G, and the third light emitter 63B to emit light in a time-division manner based on light source control signals from the signal processing circuit 20.

Figure 4:
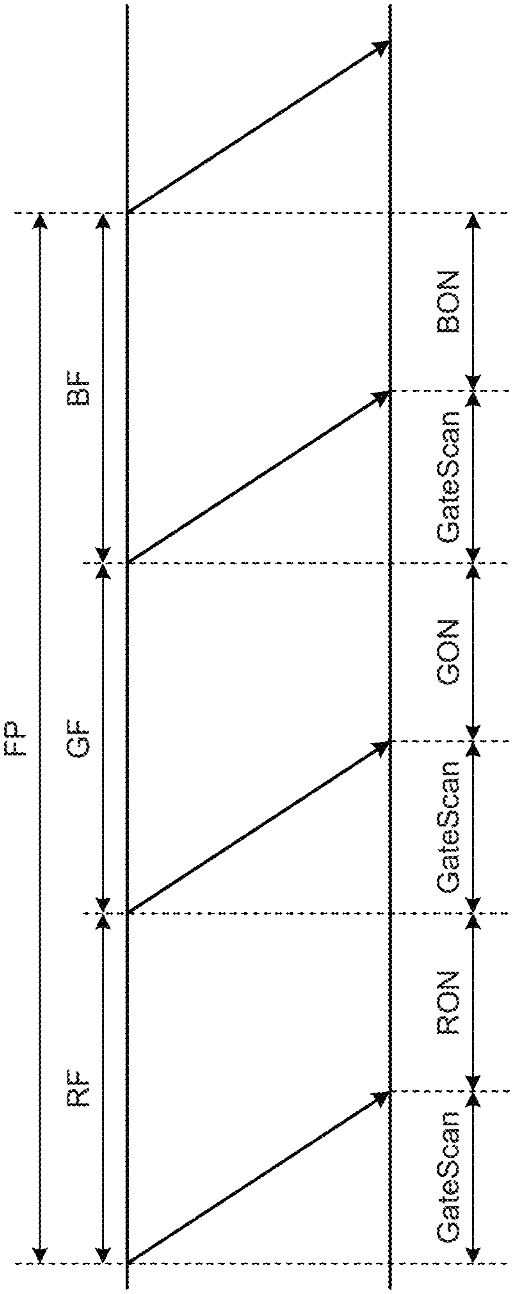
FIG. 4 is a timing chart of an image display period for displaying an image to be displayed.

FIG. 4 is a timing chart of an image display period for displaying an image to be displayed.

In the display system 1 that performs display output by the FSC system, an image display period FP of one frame for displaying the image to be displayed IS is time-divided into a first subframe period RF, a second subframe period GF, and a third subframe period BF as illustrated in FIG. 3.

In a vertical scanning period GateScan (first period) of the first subframe period RF, the scan circuit 32 shifts the target to which a drive signal GATE is output. The signal output circuit 31 outputs the pixel gradation values corresponding to the first color (e.g., red) of the image to be displayed IS to the respective pixels Pix coupled to the scan line SCL to which the drive signal GATE is supplied from the scan circuit 32.

In the subsequent light emission period RON (second period), the light source control circuit 61 causes the first light emitter 63R to emit light. First light in the first color (e.g., red) emitted from the first light emitter 63R propagates in the display panel 40. In each of portions of the liquid crystal layer corresponding to the pixels Pix, the first light having the amount of light corresponding to the pixel gradation value of the first color supplied to the pixel Pix is scattered and emitted to the outside.

In the vertical scanning period GateScan (first period) of the second subframe period GF, the scan circuit 32 shifts the target to which the drive signal GATE is output. The signal output circuit 31 outputs the pixel gradation values corresponding to the second color (e.g., green) of the image to be displayed IS to the respective pixels Pix coupled to the scan line SCL to which the drive signal GATE is supplied from the scan circuit 32.

In the subsequent light emission period GON (second period), the light source control circuit 61 causes the second light emitter 63G to emit light. Second light in the second color (e.g., green) emitted from the second light emitter 63G propagates in the display panel 40. In each of the portions of the liquid crystal layer corresponding to the pixels Pix, the second light having the amount of light corresponding to the pixel gradation value of the second color supplied to the pixel Pix is scattered and emitted to the outside.

In the vertical scanning period GateScan (first period) of the third subframe period BF, the scan circuit 32 shifts the target to which the drive signal GATE is output. The signal output circuit 31 outputs the pixel gradation values corresponding to the third color (e.g., blue) of the image to be displayed IS to the respective pixels Pix coupled to the scan line SCL to which the drive signal GATE is supplied from the scan circuit 32.

In the subsequent light emission period BON (second period), the light source control circuit 61 causes the third light emitter 63B to emit light. Third light in the third color (e.g., blue) emitted from the third light emitter 63B propagates in the display panel 40. In each of the portions the liquid crystal layer corresponding to the pixels Pix, the third light having the amount of light corresponding to the pixel gradation value of the third color supplied to the pixel Pix is scattered and emitted to the outside.

Thus, the image to be displayed IS of one frame is visually recognized by a user.

In the display system 1 with the FSC system described above, an image in which three colors of the first color (red (R)), the second color (green (G)), and the third color (blue (B)) are combined (mixed) is recognized due to the after-image phenomenon caused by limitation of temporal resolution in the human eye. The display system 1 with the FSC system does not require a color filter for each of the pixels Pix, so the light transmittance in the display area 41 can be increased.

Figure 5:
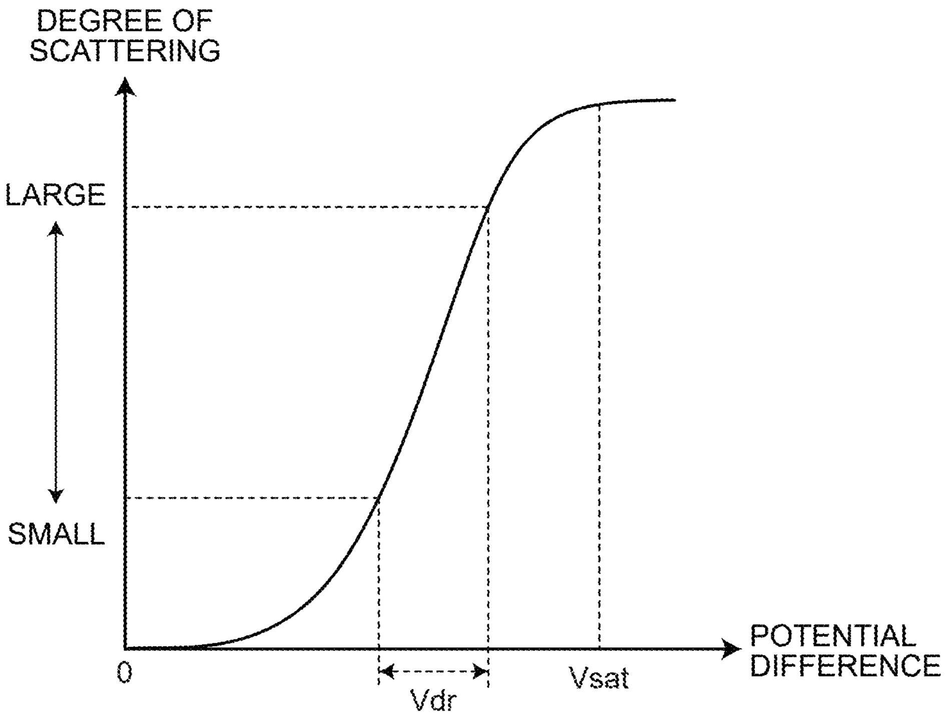
FIG. 5 is a graph for explaining the relation between the voltage applied to polymer-dispersed liquid crystal and the degree of scattering of light.

FIG. 5 is a graph for explaining the relation between the voltage applied to the polymer-dispersed liquid crystal and the degree of scattering of light. In FIG. 5, the horizontal axis indicates the potential difference between the pixel electrode PE and the common electrode CE, and the vertical axis indicates the degree of scattering of light of the polymer-dispersed liquid crystal in the pixel Pix.

As illustrated in FIG. 5, the degree of scattering of light in the pixel Pix varies with the potential difference between the pixel electrode PE and the common electrode CE. The degree of scattering of light in the pixel Pix varies less in the region where the potential difference between the pixel electrode PE and the common electrode CE is equal to or close to 0 and the region where the potential difference between the pixel electrode PE and the common electrode CE is equal to or close to a saturation voltage Vsat.

In the present disclosure, the potential difference between the pixel electrode PE and the common electrode CE is controlled in a voltage range Vdr where the degree of scattering of light in the pixel Pix linearly changes with respect to the change in the potential difference between the pixel electrode PE and the common electrode CE.

Specifically, the voltage supplied to the pixel electrode PE is controlled such that the potential difference between the pixel electrode PE and the common electrode CE falls within the voltage range Vdr where it linearly changes when the gradation value supplied to the pixel Pix is changed. As a result, the pixel electrode PE is supplied with such a voltage that the potential difference between the pixel electrode PE and the common electrode CE linearly changes according to the change in the gradation value. Therefore, the degree of scattering of light in the pixel Pix can be linearly changed according to the change in the gradation value supplied to the pixel Pix.

Figure 6A:
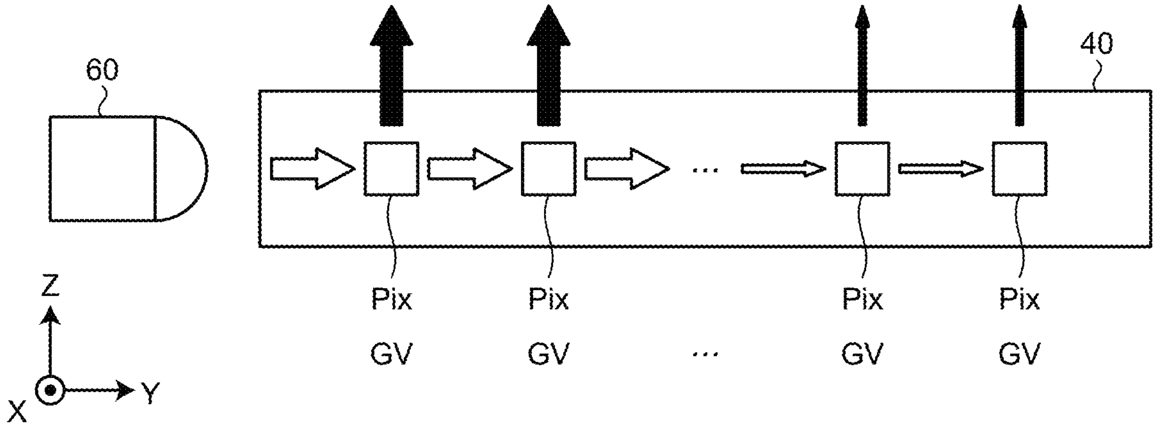
FIG. 6A is a conceptual diagram for explaining the relation between light propagating in the display panel and light emitted therefrom to the outside.
Figure 6B:
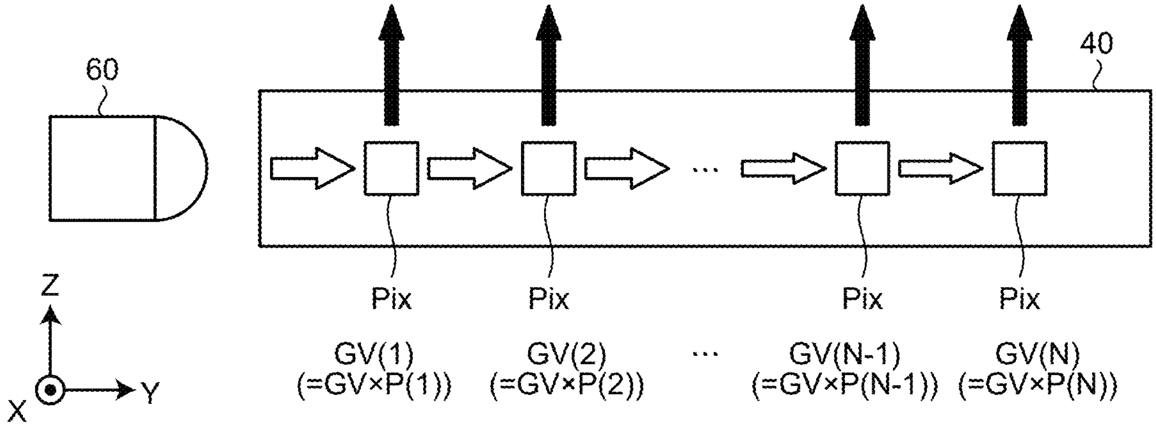
FIG. 6B is a conceptual diagram for explaining the relation between light propagating in the display panel and light emitted therefrom to the outside.

FIGS. 6A and 6B are conceptual diagrams for explaining the relation between light propagating in the display panel and light emitted therefrom to the outside. In FIGS. 6A and 6B, the thickness of the white arrows indicates the amount of light emitted from the light source 60 and propagating in the display panel 40, and the thickness of the black arrows indicates the amount of light scattered and emitted therefrom to the outside according to the gradation value of the pixel Pix.

FIG. 6A illustrates an aspect where the gradation values of the pixels Pix arrayed in the Y-direction (second direction) are the same value (GV). The light emitted from the light source 60 is consumed by the scattering of light due to the polymer-dispersed liquid crystal, and the amount of light propagating in the display panel 40 gradually decreases. As a result, the amount of light emitted to the outside in each pixel Pix gradually decreases.

FIG. 6B illustrates an aspect where the pixels Pix arrayed in the Y-direction (second direction) are supplied with gradation values GV(n). The gradation values GV(n) are obtained by multiplying the same gradation value GV illustrated in FIG. 6A by adjustment coefficients P(n) of 1 or smaller corresponding to the attenuation of light propagating in the display panel 40. In the present disclosure, the adjustment coefficient P(n) is expressed by Expression (1) below when N is the total number of pixels Pix arrayed in the Y-direction (second direction), that is, the total number of pixels arrayed in the propagation direction of light emitted from the light source 60, L is the target luminance at the maximum input gradation, T is the amount of light emitted from the light source 60 and incident on the display panel 40, and S is the adjustment parameter.

$$P(n) = L \Big/ \left(T \times S^{(n-1)}\right) \tag{1}$$

In the present disclosure, the adjustment parameter S can be set within a range of 0<S≤Sf when Sf is a value that uniformizes the in-plane luminance in the display area 41. By setting the adjustment parameter S to an intermediate value Sv within the range, the in-plane luminance average value in the display area 41 can be changed.

Figure 7A:
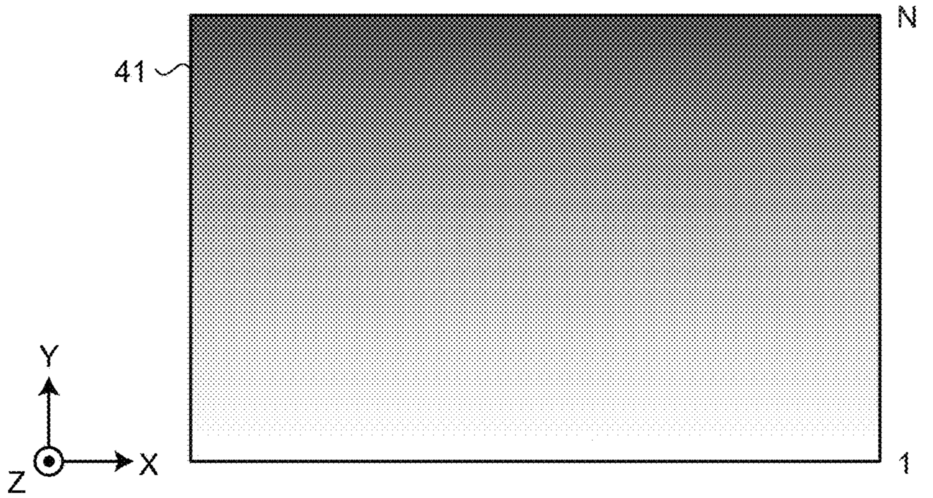
FIG. 7A is a view of a first image display example in the display system according to the first embodiment.
Figure 7B:
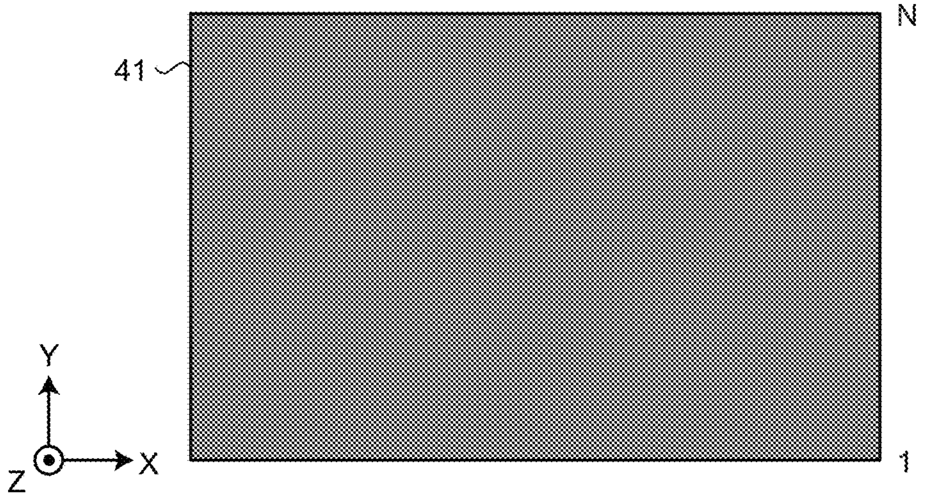
FIG. 7B is a view of the first image display example in the display system according to the first embodiment.
Figure 7C:
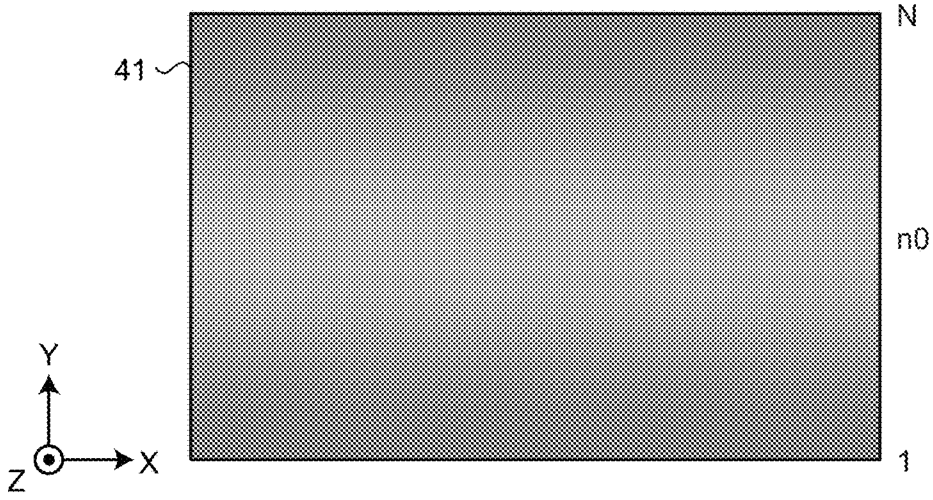
FIG. 7C is a view of the first image display example in the display system according to the first embodiment.

FIGS. 7A, 7B, and 7C are views of a first image display example in the display system according to the first embodiment. FIGS. 7A, 7B, and 7C illustrate image display examples where the input gradation values of all the pixels Pix in the display area 41 are the maximum gradation value (e.g., "255").

FIG. 7A illustrates an image display example where the input gradation values are output to the display panel 40. FIG. 7B illustrates an image display example where the gradation values each obtained by setting the adjustment parameter Sf and performing adjustment with the adjustment parameter Sf are output to the display panel 40. FIG. 7C illustrates an image display example where the gradation values each obtained by setting the adjustment parameter Sv smaller than the adjustment parameter Sf and performing adjustment with the adjustment parameter Sv are output to the display panel 40.

Figure 8A:
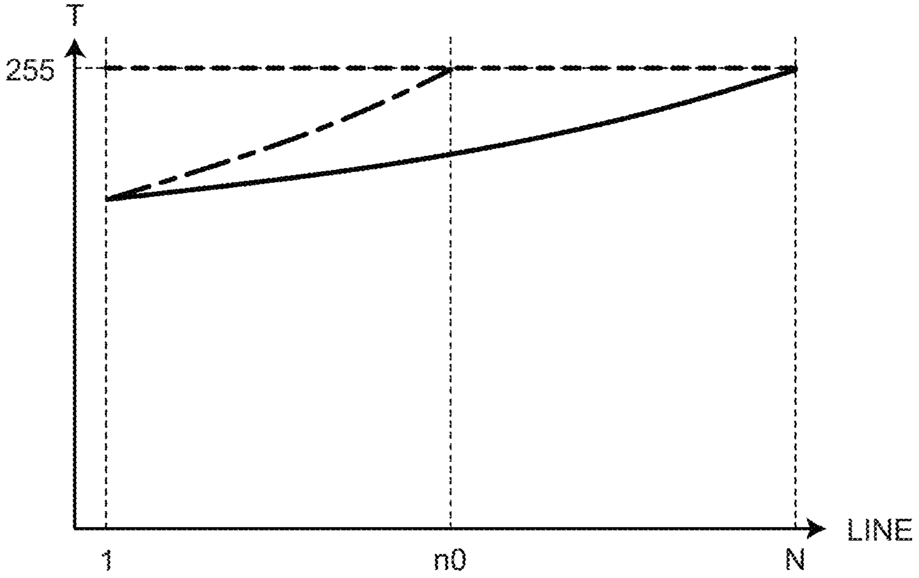
FIG. 8A is a graph of the gradation value in the first image display example illustrated in FIGS. 7A, 7B, and 7C.

FIG. 8A is a graph of the gradation value in the first image display example illustrated in FIGS. 7A, 7B, and 7C. The dashed line in FIG. 8A indicates the gradation values in the image display example where the input gradation values are output to the display panel 40. The solid line in FIG. 8A indicates the gradation values in the image display example where the gradation values each obtained by setting the adjustment parameter Sf and performing adjustment with the adjustment parameter Sf are output to the display panel 40. The alternate long and short dash line in FIG. 8A indicates the gradation values in the image display example where the gradation values each obtained by setting the adjustment parameter Sv smaller than the adjustment parameter Sf and performing adjustment with the adjustment parameter Sv are output to the display panel 40.

Figure 8B:
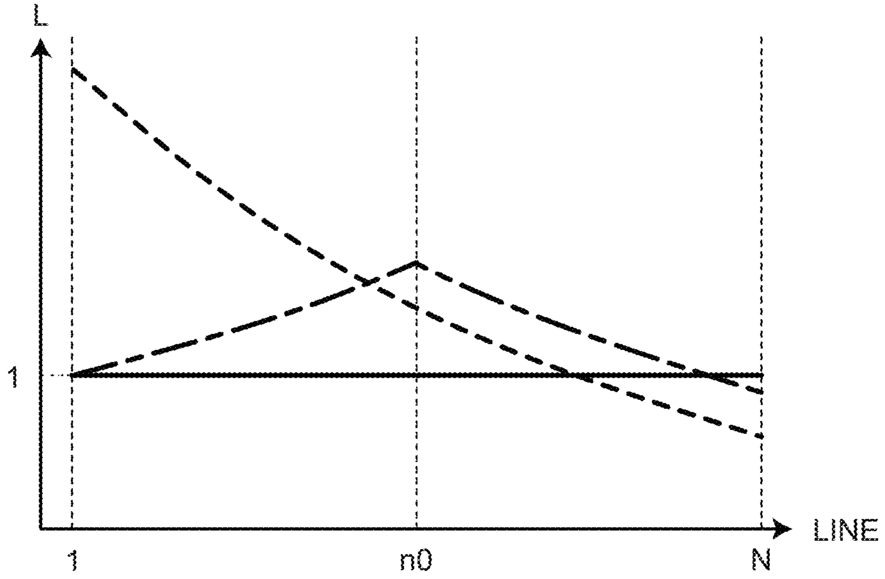
FIG. 8B is a graph of the in-plane luminance distribution in the first image display example illustrated in FIGS. 7A, 7B, and 7C.

FIG. 8B is a graph of the in-plane luminance distribution in the first image display example illustrated in FIGS. 7A, 7B, and 7C. The dashed line in FIG. 8B indicates the in-plane luminance distribution in the image display example where the input gradation values are output to the display panel 40. The solid line in FIG. 8B indicates the in-plane luminance distribution in the image display example where the gradation values each obtained by setting the adjustment parameter Sf and performing adjustment with the adjustment parameter Sf are output to the display panel 40. The alternate long and short dash line in FIG. 8B indicates the in-plane luminance distribution in the image display example where the gradation values each obtained by setting the adjustment parameter Sv smaller than the adjustment parameter Sf and performing adjustment with the adjustment parameter Sv are output to the display panel 40. In FIG. 8B, the adjusted target luminance at the maximum input gradation is normalized to 1.

Figure 9A:
FIG. 9A is a view of a second image display example in the display system according to the first embodiment.
Figure 9B:
FIG. 9B is a view of the second image display example in the display system according to the first embodiment.
Figure 9C:
FIG. 9C is a view of the second image display example in the display system according to the first embodiment.

FIGS. 9A, 9B, and 9C are views of a second image display example in the display system according to the first embodiment. FIGS. 9A, 9B, and 9C illustrate image display examples where the input gradation values of the pixels Pix in the region of n1 to n2 lines in the display area 41 are the maximum gradation value (e.g., "255") and the input gradation values of the pixels Pix in the other region are "0".

FIG. 9A illustrates an image display example where the input gradation values are output to the display panel 40. FIG. 9B illustrates an image display example where the gradation values each obtained by setting the adjustment parameter Sf and performing adjustment with the adjustment parameter Sf are output to the display panel 40. FIG. 9C illustrates an image display example where the gradation values each obtained by setting the adjustment parameter Sv smaller than the adjustment parameter Sf and performing adjustment with the adjustment parameter Sv are output to the display panel 40.

Figure 10A:
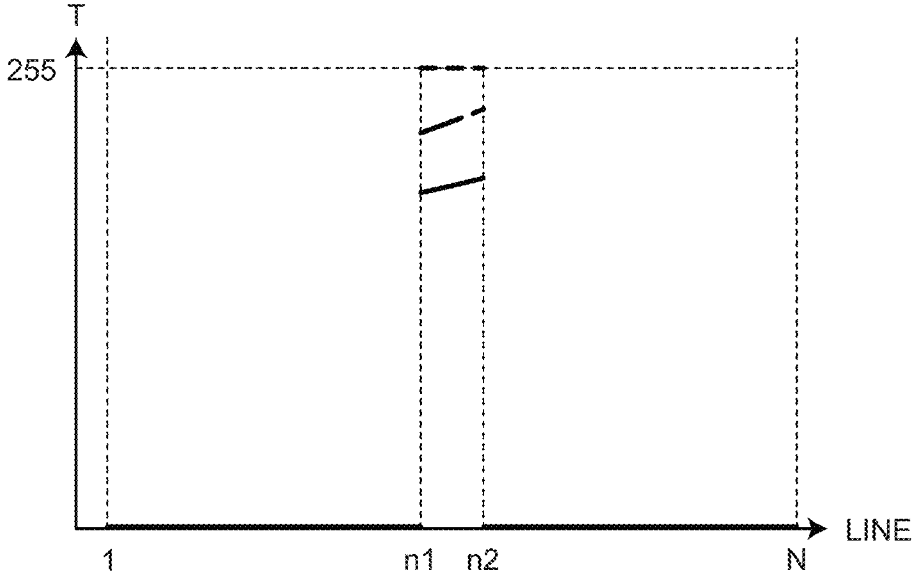
FIG. 10A is a graph of the gradation value in the second image display example illustrated in FIGS. 9A, 9B, and 9C.

FIG. 10A is a graph of the gradation value in the second image display example illustrated in FIGS. 9A, 9B, and 9C.

The dashed line in FIG. 10A indicates the gradation values in the image display example where the input gradation values are output to the display panel 40. The solid line in FIG. 10A indicates the gradation values in the image display example where the gradation values each obtained by setting the adjustment parameter Sf and performing adjustment with the adjustment parameter Sf are output to the display panel 40. The alternate long and short dash line in FIG. 10A indicates the gradation values in the image display example where the gradation values each obtained by setting the adjustment parameter Sv smaller than the adjustment parameter Sf and performing adjustment with the adjustment parameter Sv are output to the display panel 40.

Figure 10B:
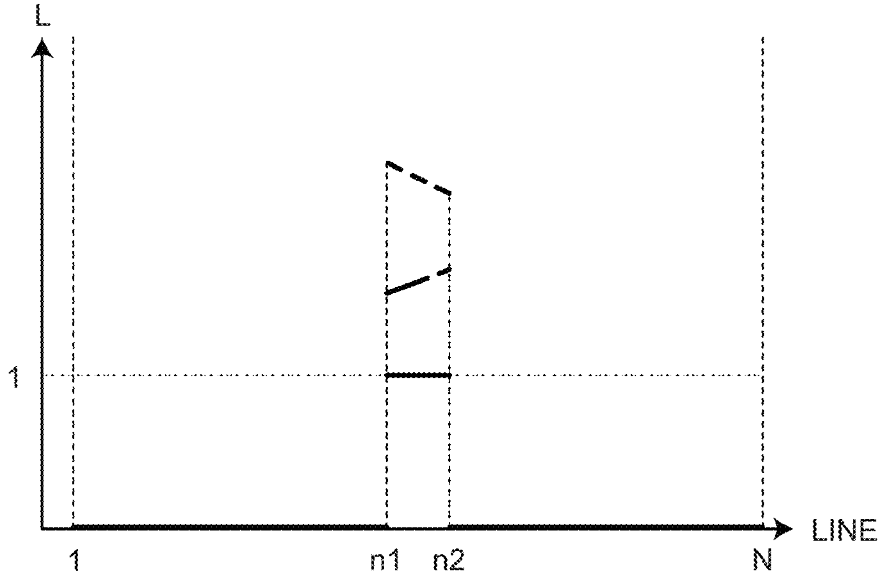
FIG. 10B is a graph of the in-plane luminance distribution in the second image display example illustrated in FIGS. 9A, 9B, and 9C.

FIG. 10B is a graph of the in-plane luminance distribution in the second image display example illustrated in FIGS. 9A, 9B, and 9C. The dashed line in FIG. 10B indicates the in-plane luminance distribution in the image display example where the input gradation values are output to the display panel 40. The solid line in FIG. 10B indicates the in-plane luminance distribution in the image display example where the gradation values each obtained by setting the adjustment parameter Sf and performing adjustment with the adjustment parameter Sf are output to the display panel 40. The alternate long and short dash line in FIG. 10B indicates the in-plane luminance distribution in the image display example where the gradation values each obtained by setting the adjustment parameter Sv smaller than the adjustment parameter Sf and performing adjustment with the adjustment parameter Sv are output to the display panel 40. In FIG. 10B, the adjusted target luminance at the maximum input gradation is normalized to 1.

If the input gradation values are output to the display panel 40, luminance gradient occurs due to a decrease in the amount of light propagating in the display panel 40. However, when the image to be displayed IS is an image having partially high luminance and relatively low (dark) average luminance, an image with high contrast can be displayed.

In contrast to this, if the gradation values each obtained by setting the adjustment parameter Sf and performing adjustment with the adjustment parameter Sf are output to the display panel 40, the in-plane luminance average value in the display area 41 decreases. The in-plane luminance of an image having an even in-plane luminance distribution and relatively high (bright) average luminance can be uniformized.

If the gradation values each obtained by setting the adjustment parameter Sv smaller than the adjustment parameter Sf and performing adjustment with the adjustment parameter Sv are output to the display panel 40, the adjustment coefficient P(n) calculated by Expression (1) described above may be 1 or larger. In the present disclosure, however, the adjustment coefficient P(n) is set to 1 or smaller. Specifically, FIGS. 8A and 8B illustrate an aspect where the adjustment coefficient P(n) calculated by Expression (1) above is 1 or larger when n≥n0 is satisfied. In this example, the adjustment coefficient P(n≥n0) by which the input gradation values for the pixels Pix included in the region from the line no to the line N are multiplied, is set to 1. As a result, the in-plane luminance average value in the display area 41 can be increased as indicated by the alternate long and short dash line in FIG. 8B.

The signal processing circuit 20 according to the present disclosure controls the gradation values that are output to the display panel 40 according to the relative brightness of the image to be displayed IS. The following describes a specific example of gradation value control in the display system 1 according to the first embodiment.

Figure 11:
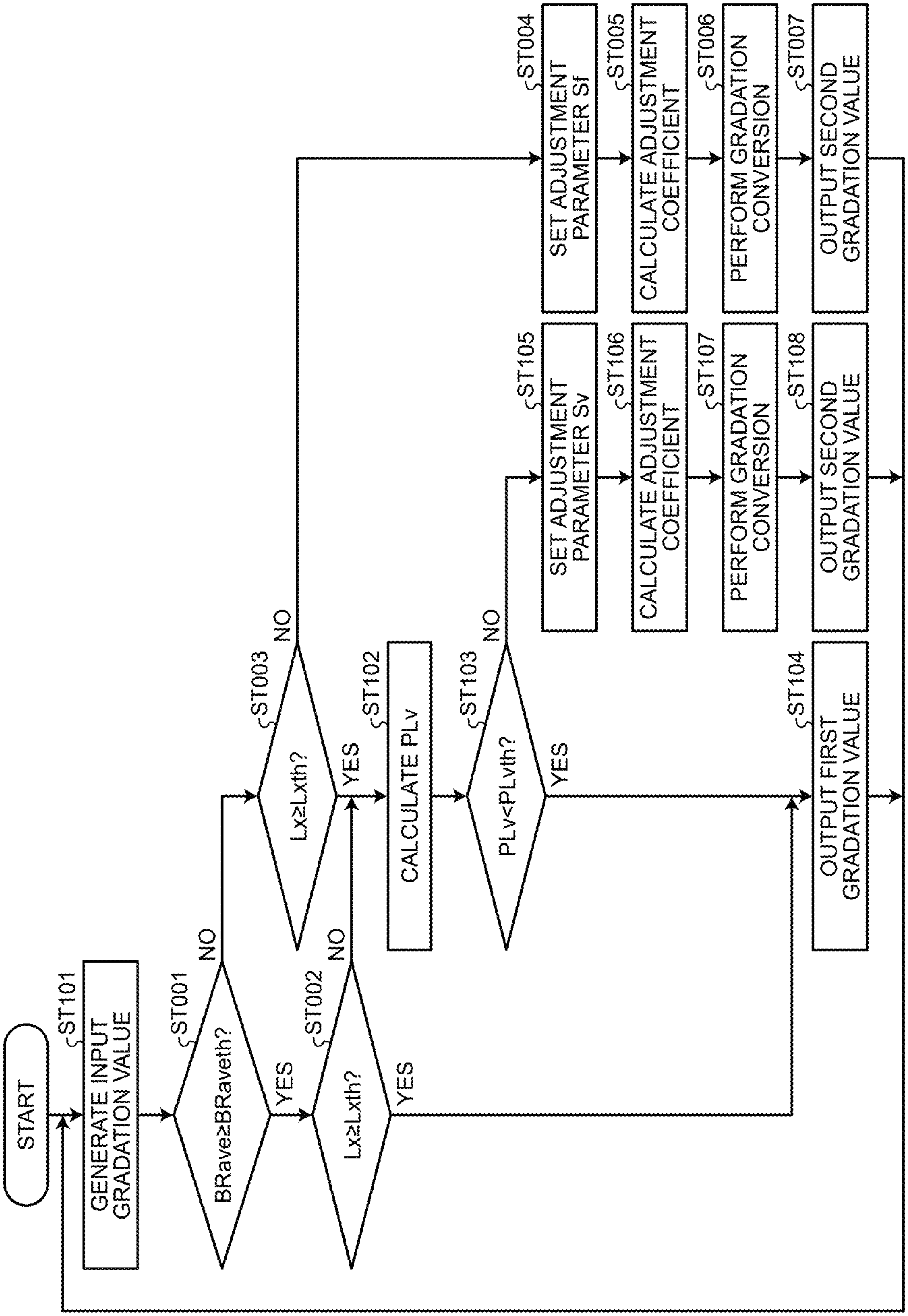
FIG. 11 is a flowchart of an example of a gradation value generation process according to the first embodiment.

FIG. 11 is a flowchart of an example of a gradation value generation process according to the first embodiment.

In the gradation value generation process illustrated in FIG. 11, the signal processing circuit 20 generates the input gradation values corresponding to the pixels Pix in the display area 41 based on the image to be displayed IS (Step ST101). The signal processing circuit 20 calculates average luminance BRave of the background image acquired by the camera 52 and determines whether the average luminance BRave is equal to or larger than a predetermined threshold BRaveth (Step ST001).

If the average luminance BRave of the background image acquired by the camera 52 is equal to or larger than the threshold BRaveth (Yes at Step ST001), the signal processing circuit 20 determines whether illuminance Lx acquired by the illuminance sensor 51 is equal to or larger than a predetermined threshold Lxth (Step ST002). If the illuminance Lx acquired by the illuminance sensor 51 is equal to or larger than the threshold Lxth (Yes at Step ST002), the signal processing circuit 20 outputs the input gradation values generated at Step ST101 to the display panel 40 as the first gradation values (Step ST104) and performs the processing at Step ST101 again.

If the average luminance BRave of the background image acquired by the camera 52 is smaller than the threshold BRaveth (No at Step ST001), the signal processing circuit 20 determines whether the illuminance Lx acquired by the illuminance sensor 51 is equal to or larger than the predetermined threshold Lxth (Step ST003). If the illuminance Lx acquired by the illuminance sensor 51 is smaller than the predetermined threshold Lxth (No at Step ST003), the signal processing circuit 20 sets the adjustment parameter Sf that uniformizes the in-plane luminance in the display area 41 (Step ST004). The signal processing circuit 20 calculates the adjustment coefficients P(n) corresponding to the pixels Pix arrayed in the propagation direction (Y-direction (second direction)) of light emitted from the light source 60 using Expression (1) described above (Step ST005).

The signal processing circuit 20 performs gradation conversion of multiplying each of the input gradation values generated at Step ST101 by the adjustment coefficient P(n) calculated at Step ST005 (Step ST006). The signal processing circuit 20 outputs the gradation values resulting from the gradation conversion to the display panel 40 as the second gradation values (Step ST007) and performs the processing at Step ST101 again.

If the average luminance BRave of the background image acquired by the camera 52 is equal to or larger than the threshold BRaveth (Yes at Step ST001) and the illuminance Lx acquired by the illuminance sensor 51 is smaller than the threshold Lxth (No at Step ST002), or if the average luminance BRave of the background image acquired by the camera 52 is smaller than the threshold BRaveth (No at Step ST001) and the illuminance Lx acquired by the illuminance sensor 51 is equal to or larger than the threshold Lxth (Yes at Step ST003), the signal processing circuit 20 calculates a display image level PLv that defines the brightness of the image to be displayed IS using Expressions (2) to (5) below (Step ST102).

Specifically, the signal processing circuit 20 calculates the average value GVRave of the input gradation values of the first color (e.g., red) included in the image to be displayed IS using Expression (2) below. In Expression (2), GVR<m, n> represents the input gradation value of the first color corresponding to the pixel Pix in the m-th column and the n-th row.

$$GVRave = \frac{\sum_{m=0}^{M}\sum_{n=0}^{M} GVR\langle m, n\rangle}{m \times n} \quad (2)$$

The signal processing circuit 20 calculates the average value GVGave of the input gradation values of the second color (e.g., green) included in the image to be displayed IS using Expression (3) below. In Expression (3), GVG<m, n> represents the input gradation value of the second color corresponding to the pixel Pix in the m-th column and the n-th row.

$$GVGave = \frac{\sum_{m=0}^{M}\sum_{n=0}^{M} GVG\langle m, n\rangle}{m \times n} \quad (3)$$

The signal processing circuit 20 calculates the average value GVBave of the input gradation values of the third color (e.g., blue) included in the image to be displayed IS using Expression (4) below. In Expression (4), GVB<m, n> represents the input gradation value of the third color corresponding to the pixel Pix in the m-th column and the n-th row.

$$GVBave = \frac{\sum_{m=0}^{M}\sum_{n=0}^{M} GVB\langle m, n\rangle}{m \times n} \quad (4)$$

Expression (5) is a function that determines the smallest of the average values GVRave, GVGave, and GVBave to be the display image level PLv.

$$PLv = \mathrm{Min}(GVRave, GVGave, GVBave) \quad (5)$$

Subsequently, the signal processing circuit 20 determines whether the calculated display image level PLV is smaller than a predetermined threshold PLvth (Step ST103). If the display image level PLv is smaller than the predetermined threshold PLvth (Yes at Step ST103), the signal processing circuit 20 outputs the input gradation values generated at Step ST101 to the display panel 40 as the first gradation values (Step ST104) and performs the processing at Step ST101 again.

If the display image level PLv is equal to or larger than the predetermined threshold PLvth (No at Step ST103), the signal processing circuit 20 sets the adjustment parameter Sv corresponding to the display image level PLv calculated at Step ST102 (Step ST105). The signal processing circuit 20 calculates the adjustment coefficients P(n) corresponding to the pixels Pix arrayed in the propagation direction (Y-direction (second direction)) of light emitted from the light source 60 using Expression (1) above (Step ST106).

Figure 12A:
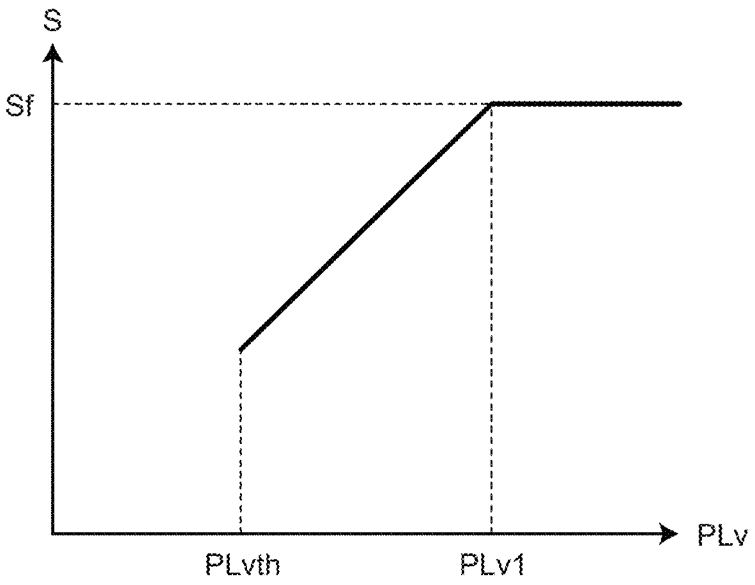
FIG. 12A is a graph of the relation between the display image level and an adjustment parameter.
Figure 12B:
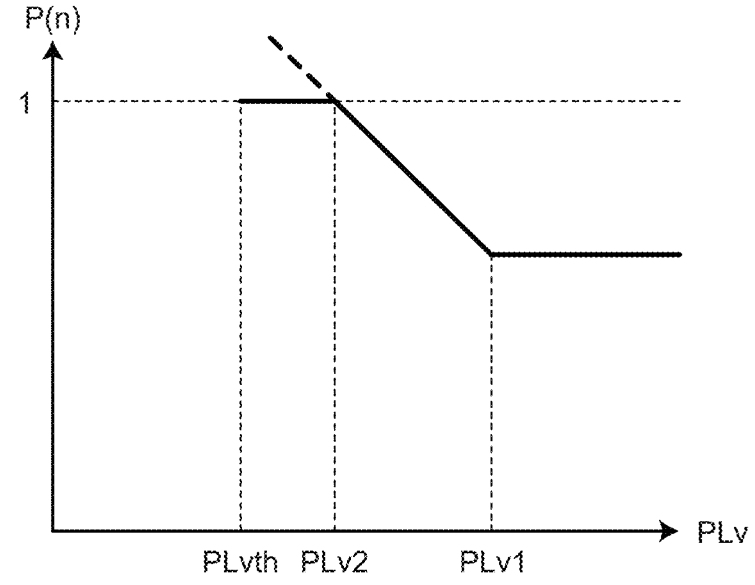
FIG. 12B is a graph of the relation between the display image level and an adjustment coefficient.

FIG. 12A is a graph of the relation between the display image level and the adjustment parameter. FIG. 12B is a graph of the relation between the display image level and the adjustment coefficient.

In the example illustrated in FIG. 12A, in the region of PLv≥PLv1, the signal processing circuit 20 sets the adjustment parameter Sf that uniformizes the in-plane luminance in the display area 41. In the region of PLvth≤PLv<PLv1, the signal processing circuit 20 sets the adjustment parameter Sv that monotonically decreases as the display image level PLV decreases. As a result, the adjustment coefficient P(n) calculated by Expression (1) above monotonically increases as the display image level PLv decreases in the region of PLvth≤PLv<PLv1 as illustrated in FIG. 12B.

In FIG. 12B, the adjustment coefficient P(n) calculated by Expression (1) above is equal to or larger than 1 in the region of PLvth≤PLv≤PLv2 as indicated by the dashed line. Therefore, FIG. 12B illustrates an aspect where the adjustment coefficient P(n) is set to 1 in the region of PLvth≤PLV≤PLv2.

Referring back to FIG. 11, the signal processing circuit 20 performs gradation conversion of multiplying each of the input gradation values generated at Step ST101 by the adjustment coefficient P(n) calculated at Step ST106 (Step ST107). The signal processing circuit 20 outputs the gradation values resulting from the gradation conversion to the display panel 40 as the second gradation values (Step ST108) and performs the processing at Step ST101 again.

In the gradation value generation process in the display system 1 according to the first embodiment described above, if the average luminance BRave of the background image acquired by the camera 52 is equal to or larger than the threshold BRaveth (Yes at Step ST001) and the illuminance Lx acquired by the illuminance sensor 51 is equal to or larger than the threshold Lxth (Yes at Step ST002), the input gradation values generated at Step ST101 are output to the display panel 40 as the first gradation values (Step ST104). Therefore, an image with high contrast can be displayed independently of the brightness of the input image IS.

In the gradation value generation process in the display system 1 according to the first embodiment described above, if the average luminance BRave of the background image acquired by the camera 52 is smaller than the threshold BRaveth (No at Step ST001) and the illuminance Lx acquired by the illuminance sensor 51 is smaller than the threshold Lxth (No at Step ST003), the gradation values resulting from gradation conversion calculated using the adjustment parameter Sf that uniformizes the in-plane luminance in the display area 41, are output to the display panel 40 as the second gradation values (Step ST007). Therefore, the in-plane luminance in the display area 41 can be uniformized independently of the brightness of the input image IS.

In the gradation value generation process in the display system 1 according to the first embodiment described above, if the average luminance BRave of the background image acquired by the camera 52 is equal to or larger than the threshold BRaveth (Yes at Step ST001) and the illuminance Lx acquired by the illuminance sensor 51 is smaller than the threshold Lxth (No at Step ST002), or if the average luminance BRave of the background image acquired by the camera 52 is smaller than the threshold BRaveth (No at Step ST001) and the illuminance Lx acquired by the illuminance sensor 51 is equal to or larger than the threshold Lxth (Yes at Step ST003), the signal processing circuit 20 controls the gradation values output to the display panel 40 according to the brightness of the input image IS.

Specifically, when the image to be displayed IS is, for example, an image having partially high luminance and relatively low (dark) average luminance, such as a text image to be displayed, it is assumed that the display image level PLv is smaller than the threshold PLvth at Step ST103 (Yes at Step ST103). As a result, the input gradation values generated at Step ST101 are output to the display panel 40 as the first gradation values (Step ST104), and an image with high contrast can be displayed.

When the image to be displayed IS is, for example, an image having relatively high (bright) average luminance, it is assumed that the display image level PLv is equal to or larger than the threshold PLvth at Step ST103 (No at Step ST103). When the image to be displayed IS is, for example, an image having an even in-plane luminance distribution, such as a map image to be displayed, it is assumed that the display image level PLv is within the region of PLv≥PLv1 illustrated in FIG. 12A. As a result, the gradation values resulting from gradation conversion calculated using the adjustment parameter Sf that uniformizes the in-plane luminance in the display area 41, are output to the display panel 40 as the second gradation values (Step ST108). Thus, the in-plane luminance in the display area 41 can be uniformized.

When the image to be displayed IS is, for example, an image having intermediate luminance and small unevenness in luminance distribution, such as a natural image, it is assumed that the display image level PLv is within the region of PLvth≤PLV<PLv1 illustrated in FIG. 12A. As a result, the gradation values resulting from gradation conversion calculated using the adjustment parameter Sv smaller than the adjustment parameter Sf are output to the display panel 40 as the second gradation values (Step ST108). Thus, the in-plane luminance average value in the display area 41 can be increased.

While the embodiment above has described an aspect where the display image level PLv is the minimum average value of the input gradation values of a plurality of colors included in the image to be displayed IS, the embodiment is not limited thereto. For example, the display image level PLv may be the area ratio of the region where the gradation value is equal to or smaller than a predetermined value in the image to be displayed IS.

Modification

Figure 13:
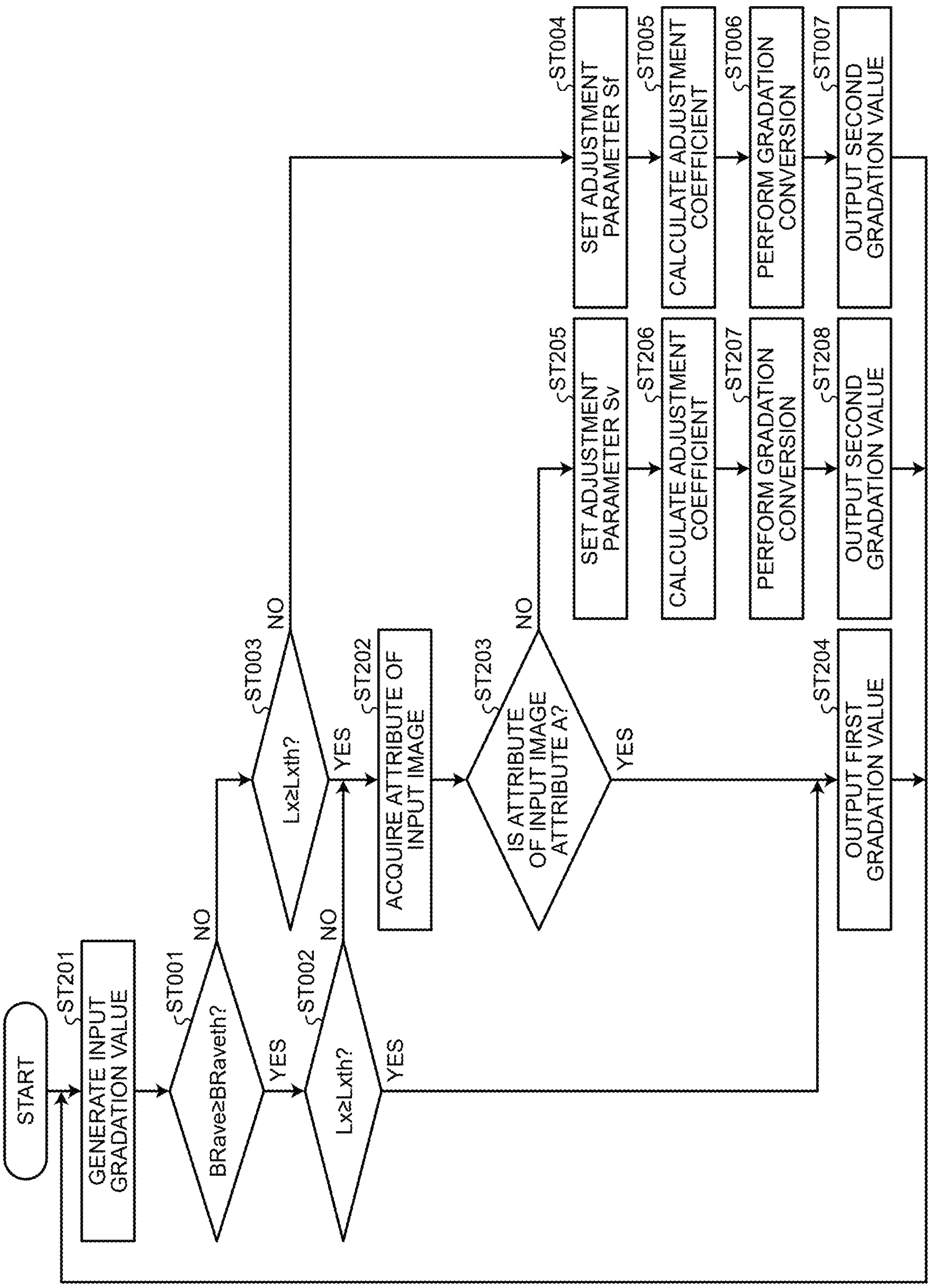
FIG. 13 is a flowchart of an example of the gradation value generation process according to a modification of the first embodiment.

FIG. 13 is a flowchart of an example of the gradation value generation process according to a modification of the first embodiment. The following describes an aspect where the signal processing circuit 20 indirectly classifies the relative brightness based on an attribute of the image to be displayed IS and controls the gradation values that are output to the display panel 40 if the average luminance BRave of the background image acquired by the camera 52 is equal to or larger than the threshold BRaveth (Yes at Step ST001) and the illuminance Lx acquired by the illuminance sensor 51 is smaller than the threshold Lxth (No at Step ST002) or if the average luminance BRave of the background image acquired by the camera 52 is smaller than the threshold BRaveth (No at Step ST001) and the illuminance Lx acquired by the illuminance sensor 51 is equal to or larger than the threshold Lxth (Yes at Step ST003). The attribute of the image to be displayed IS may be added to the image to be displayed IS as a label or added thereto by image classification by machine learning using AI, for example.

In the gradation value generation process illustrated in FIG. 13, the signal processing circuit 20 generates the input gradation values corresponding to the pixels Pix in the display area 41 based on the image to be displayed IS (Step ST201) and acquires an attribute of the image to be displayed IS (Step ST202).

Subsequently, the signal processing circuit 20 determines whether the attribute of the image to be displayed IS acquired at Step ST202 is an attribute A (Step ST203). If the attribute of the image to be displayed IS is the attribute A (Yes at Step ST203), the signal processing circuit 20 outputs the input gradation values generated at Step ST201 to the display panel 40 as the first gradation values (Step ST204) and performs the processing at Step ST201 again.

If the attribute of the image to be displayed IS is not the attribute A (No at Step ST203), the signal processing circuit 20 sets the adjustment parameter Sv smaller than the adjustment parameter Sf (Step ST205). The signal processing circuit 20 calculates the adjustment coefficients P(n) corresponding to the pixels Pix arrayed in the propagation direction (Y-direction (second direction)) of light emitted from the light source 60 using Expression (1) described above (Step ST206).

The signal processing circuit 20 performs gradation conversion of multiplying each of the input gradation values generated at Step ST201 by the adjustment coefficient P(n) calculated at Step ST211 (Step ST207). The signal processing circuit 20 outputs the gradation values resulting from the gradation conversion to the display panel 40 as the second gradation values (Step ST208) and performs the processing at Step ST201 again.

In the gradation value generation process in the display system 1 according to the modification of the first embodiment described above, the attribute A is assumed to specify, for example, that the image to be displayed IS is an image having partially high luminance and relatively low (dark) average luminance, such as a text image to be displayed (Yes at Step ST203). As a result, the input gradation values generated at Step ST201 are output to the display panel 40 as the first gradation values (Step ST204), and an image with high contrast can be displayed.

In the gradation value generation process in the display system 1 according to the modification of the first embodiment described above, if the attribute of the image to be displayed IS is not the attribute A (No at Step ST203), the image to be displayed IS is assumed to be, for example, an image having an even in-plane luminance distribution, such as a map image to be displayed, or an image having intermediate luminance and small unevenness in luminance distribution, such as a natural image, and an image having relatively high (bright) average luminance. As a result, the gradation values resulting from gradation conversion calculated using the adjustment parameter Sv smaller than the adjustment parameter Sf, are output to the display panel 40 as the second gradation values (Step ST208). Therefore, the in-plane luminance average value in the display area 41 can be increased.

Second Embodiment

Figure 14:
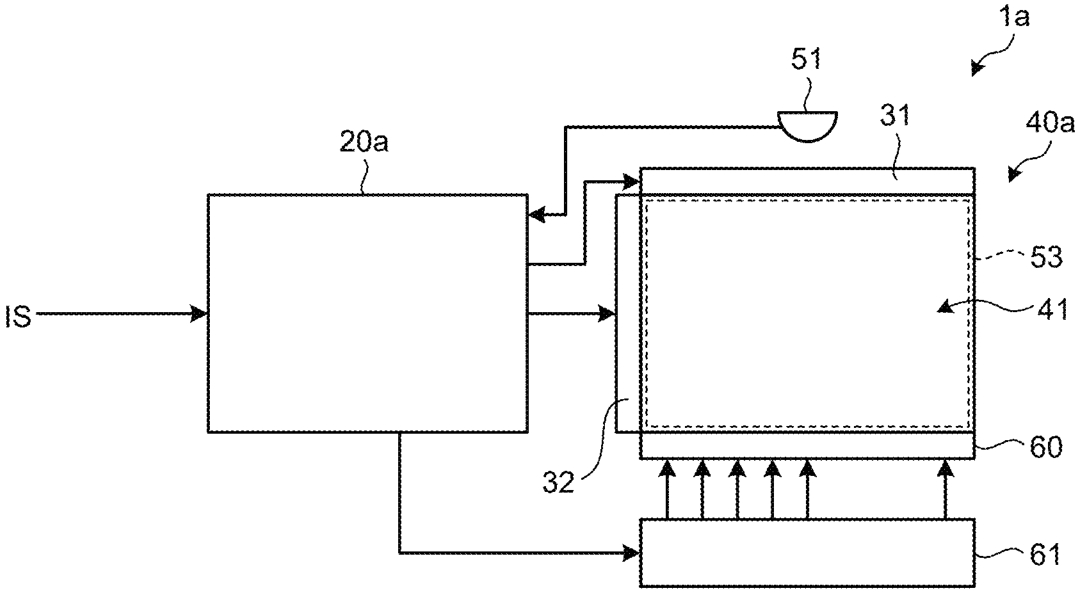
FIG. 14 is a schematic of an example of a block configuration of the display system according to a second embodiment.

FIG. 14 is a schematic of an example of a block configuration of the display system according to a second embodiment. A display system 1*a* according to the second embodiment includes an electrochromic layer 53 that makes the background of the display area 41 invisible, instead of the camera 52 described in the first embodiment. The area provided with the electrochromic layer 53 is larger than the display area 41 in plan view.

Figure 15:
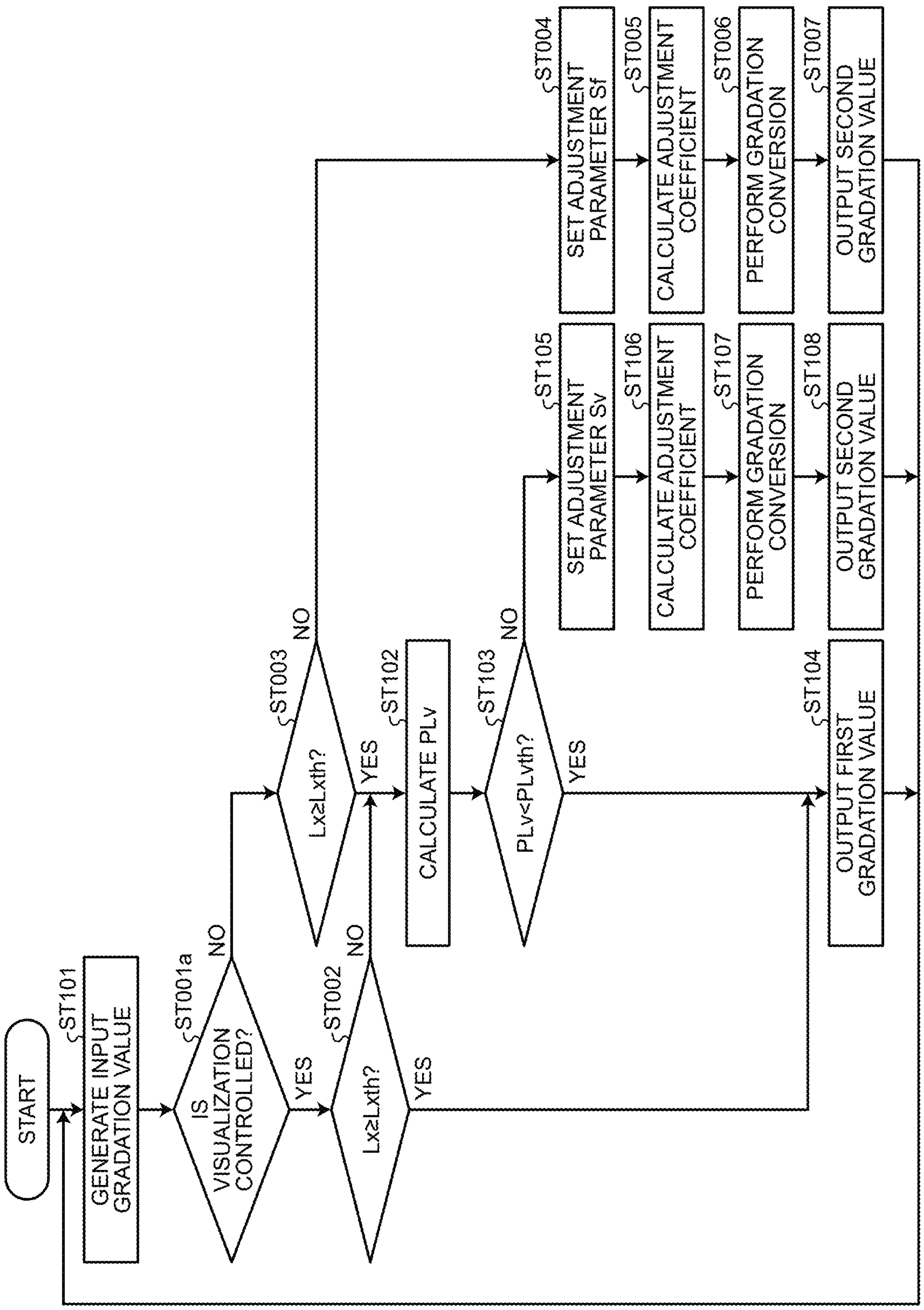
FIG. 15 is a flowchart of an example of the gradation value generation process according to the second embodiment.

FIG. 15 is a flowchart of an example of the gradation value generation process according to the second embodiment. Explanation of the processing described in the first embodiment may be omitted herein.

In the gradation value generation process illustrated in FIG. 15, a signal processing circuit 20*a* generates the input gradation values corresponding to the pixels Pix in the display area 41 based on the image to be displayed IS (Step ST101) and determines whether the background of the display area 41 is made visible by the electrochromic layer 53 (Step ST001*a*).

If the background of the display area 41 is made visible by the electrochromic layer 53 (Yes at Step ST001*a*), the signal processing circuit 20*a* determines whether the illuminance Lx acquired by the illuminance sensor 51 is equal to or larger than the predetermined threshold Lxth (Step ST002). If the illuminance Lx acquired by the illuminance sensor 51 is equal to or larger than the threshold Lxth (Yes at Step ST002), the signal processing circuit 20*a* outputs the input gradation values generated at Step ST101 to a display panel 40*a* as the first gradation values (Step ST104) and performs the processing at Step ST101 again.

If the background of the display area 41 is made invisible by the electrochromic layer 53 (No at Step ST001*a*), the signal processing circuit 20*a* determines whether the illuminance Lx acquired by the illuminance sensor 51 is equal to or larger than the predetermined threshold Lxth (Step ST003). If the illuminance Lx acquired by the illuminance sensor 51 is smaller than the predetermined threshold Lxth (No at Step ST003), the signal processing circuit 20*a* sets the adjustment parameter Sf that uniformizes the in-plane luminance in the display area 41 (Step ST004). The signal processing circuit 20*a* calculates the adjustment coefficients P(n) corresponding to the pixels Pix arrayed in the propagation direction (Y-direction (second direction)) of light emitted from the light source 60 using Expression (1) above (Step ST005).

The signal processing circuit 20*a* performs gradation conversion of multiplying each of the input gradation values generated at Step ST101 by the adjustment coefficient P(n) calculated at Step ST005 (Step ST006). The signal processing circuit 20*a* outputs the gradation values resulting from the gradation conversion to the display panel 40 as the second gradation values (Step ST007) and performs the processing at Step ST101 again.

If the background of the display area 41 is made visible by the electrochromic layer 53 (Yes at Step ST001*a*) and the illuminance Lx acquired by the illuminance sensor 51 is smaller than the threshold Lxth (No at Step ST002) or if the background of the display area 41 is made invisible by the electrochromic layer 53 (No at Step ST001*a*) and the illuminance Lx acquired by the illuminance sensor 51 is equal to or larger than the threshold Lxth (Yes at Step ST003), the signal processing circuit 20*a* performs the processing from Step ST102 described in the first embodiment.

In the gradation value generation process in the display system 1*a* according to the second embodiment described above, if the illuminance Lx acquired by the illuminance sensor 51 is equal to or larger than the predetermined threshold Lxth (Yes at Step ST001), that is, under a relatively bright environment, the input gradation values generated at Step ST101 are output to the display panel 40 as the first gradation values (Step ST104). Therefore, an image with high contrast can be displayed independently of the brightness of the image to be displayed IS.

Modification

Figure 16:
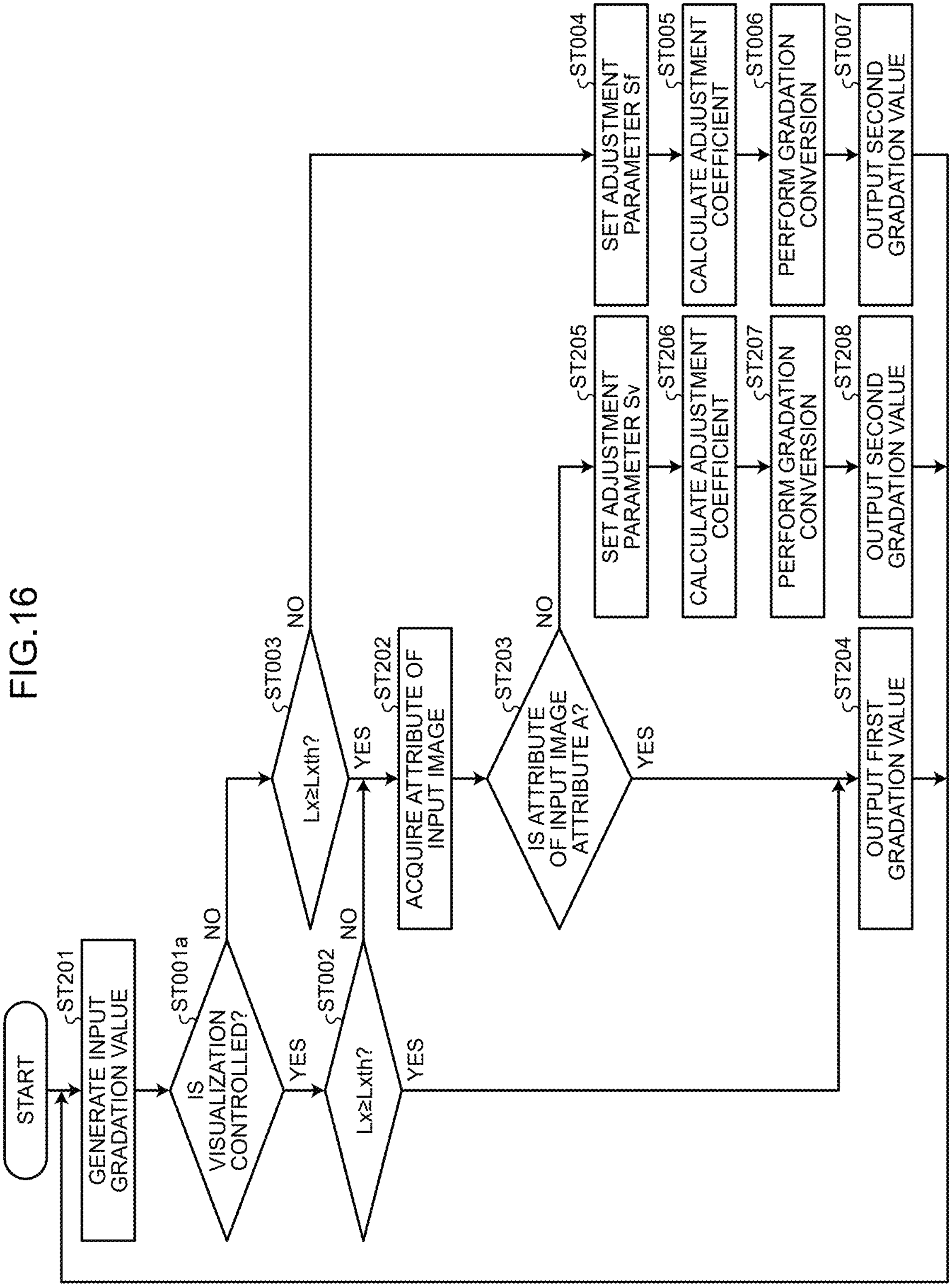
FIG. 16 is a flowchart of an example of the gradation value generation process according to a modification of the second embodiment.

FIG. 16 is a flowchart of an example of the gradation value generation process according to a modification of the second embodiment. Explanation of the processing described in the modification of the first embodiment may be omitted herein.

In the gradation value generation process illustrated in FIG. 16, a signal processing circuit 20*a* generates the input gradation values corresponding to the pixels Pix in the display area 41 based on the image to be displayed IS (Step ST201) and determines whether the background of the display area 41 is made visible by the electrochromic layer 53 (Step ST001*a*).

If the background of the display area 41 is made visible by the electrochromic layer 53 (Yes at Step ST001*a*), the signal processing circuit 20*a* determines whether the illuminance Lx acquired by the illuminance sensor 51 is equal to or larger than the predetermined threshold Lxth (Step ST002). If the illuminance Lx acquired by the illuminance sensor 51 is equal to or larger than the threshold Lxth (Yes at Step ST002), the signal processing circuit 20*a* outputs the input gradation values generated at Step ST101 to a display panel 40*a* as the first gradation values (Step ST104) and performs the processing at Step ST101 again.

If the background of the display area 41 is made invisible by the electrochromic layer 53 (No at Step ST001*a*), the signal processing circuit 20*a* determines whether the illuminance Lx acquired by the illuminance sensor 51 is equal to or larger than the predetermined threshold Lxth (Step ST003). If the illuminance Lx acquired by the illuminance sensor 51 is smaller than the predetermined threshold Lxth (No at Step ST003), the signal processing circuit 20*a* sets the adjustment parameter Sf that uniformizes the in-plane luminance in the display area 41 (Step ST004). The signal processing circuit 20*a* calculates the adjustment coefficients P(n) corresponding to the pixels Pix arrayed in the propagation direction (Y-direction (second direction)) of light emitted from the light source 60 using Expression (1) above (Step ST005).

The signal processing circuit 20*a* performs gradation conversion of multiplying each of the input gradation values generated at Step ST101 by the adjustment coefficient P(n) calculated at Step ST005 (Step ST006). The signal processing circuit 20*a* outputs the gradation values resulting from the gradation conversion to the display panel 40 as the second gradation values (Step ST007) and performs the processing at Step ST101 again.

If the background of the display area 41 is made visible by the electrochromic layer 53 (Yes at Step ST001*a*) and the illuminance Lx acquired by the illuminance sensor 51 is smaller than the threshold Lxth (No at Step ST002), or if the background of the display area 41 is made invisible by the electrochromic layer 53 (No at Step ST001*a*) and the illuminance Lx acquired by the illuminance sensor 51 is equal to or larger than the threshold Lxth (Yes at Step ST003), the signal processing circuit 20*a* performs the processing from Step ST202 described in the modification of the first embodiment.

In the gradation value generation process in the display system 1*a* according to the modification of the second embodiment described above, if the illuminance Lx acquired by the illuminance sensor 51 is equal to or larger than the predetermined threshold Lxth (Yes at Step ST001), that is, under a relatively bright environment, the input gradation values generated at Step ST201 are output to the display panel 40 as the first gradation values (Step ST204). Therefore, an image with high contrast can be displayed independently of the attribute of the image to be displayed IS.

Although the preferred embodiments of the present disclosure have been described above, the present disclosure is not limited to the embodiments described above. The content disclosed in the embodiments is merely an example, and can be variously modified within the scope not departing from the gist of the present disclosure. For example, any modifications appropriately made within the scope not departing from the gist of the present disclosure also naturally belong to the technical scope of the present invention.

What is claimed is:

1. A display system comprising:

a display panel that has a display area provided with a plurality of pixels arrayed in a first direction and a second direction intersecting the first direction and is configured to allow a user to visually recognize a background transmitted through the display area;

a light source configured to emit light in the second direction toward a side surface of the display panel extending in the first direction;

a signal processing circuit configured to generate input gradation values corresponding to the pixels based on an image to be displayed and output either first gradation values that are the input gradation values or second gradation values obtained by multiplying each of the input gradation values by an adjustment coefficient of 1 or smaller corresponding to attenuation of light propagating in the display panel;

an illuminance sensor configured to measure environmental illuminance; and a camera configured to acquire a background image transmitted through the display panel, wherein the signal processing circuit is configured to output the first gradation values when average luminance of the background image is equal to or larger than a first predetermined value and illuminance acquired by the illuminance sensor is equal to or larger than a second predetermined value, and the signal processing circuit is configured to output the second gradation values when the average luminance of the background image is smaller than the first predetermined value and the illuminance is smaller than the second predetermined value.

2. The display system according to claim 1, wherein the display panel is a liquid crystal panel in which polymer-dispersed liquid crystal is sealed.

3. The display system according to claim 1, wherein the signal processing circuit is configured to output the second gradation values when the average luminance of the background image is equal to or larger than the first predetermined value and the illuminance is smaller than the second predetermined value or when the average luminance of the background image is smaller than the first predetermined value and the illuminance is equal to or larger than the second predetermined value, and the signal processing circuit is configured to set the adjustment coefficient based on brightness of the image to be displayed.

4. The display system according to claim 3, wherein the signal processing circuit is configured to monotonically increase the adjustment coefficient as the brightness of the image to be displayed decreases.

5. The display system according to claim 1, wherein the signal processing circuit is configured to calculate, as a display image level, the minimum average value of pixel gradation values of respective colors included in the image to be displayed, and the signal processing circuit is configured to output the second gradation values when the average luminance of the background image is equal to or larger than the first predetermined value and the illuminance is smaller than the second predetermined value or when the average luminance of the background image is smaller than the first predetermined value and the illuminance is equal to or larger than the second predetermined value and when the display image level is equal to or larger than a third predetermined value.

6. The display system according to claim 5, wherein the signal processing circuit is configured to set the adjustment coefficient based on the display image level.

7. The display system according to claim 6, wherein the signal processing circuit is configured to monotonically increase the adjustment coefficient as the display image level decreases.

8. The display system according to claim 1, wherein the signal processing circuit is configured to output, based on an attribute of the image to be displayed, the first gradation values or the second gradation values when the average luminance of the background image is equal to or larger than the first predetermined value and the illuminance is smaller than the second predetermined value or when the average luminance of the background image is smaller than the first predetermined value and the illuminance is equal to or larger than the second predetermined value.

9. The display system according to claim 8, wherein the signal processing circuit is configured to set the adjustment coefficient based on the attribute of the image to be displayed.

10. A display system comprising:

a display panel that has a display area provided with a plurality of pixels arrayed in a first direction and a second direction intersecting the first direction and is provided with an electrochromic layer configured to make a background of the display area invisible;

a light source configured to emit light in the second direction toward a side surface of the display panel extending in the first direction;

a signal processing circuit configured to generate input gradation values corresponding to the pixels based on an image to be displayed and output either first gradation values that are the input gradation values or second gradation values obtained by multiplying each of the input gradation values by an adjustment coefficient of 1 or smaller corresponding to attenuation of light propagating in the display panel; and an illuminance sensor configured to measure environmental illuminance, wherein the signal processing circuit is configured to output the first gradation values when the background of the display area is made visible and illuminance acquired by the illuminance sensor is equal to or larger than a second predetermined value, and the signal processing circuit outputs the second gradation values when the background of the display area is made invisible by the electrochromic layer and the illuminance is smaller than the second predetermined value.

11. The display system according to claim 10, wherein the display panel is a liquid crystal panel in which polymer-dispersed liquid crystal is sealed.

12. The display system according to claim 10, wherein the signal processing circuit is configured to output the second gradation values when the background of the display area is made visible and the illuminance is smaller than the second predetermined value or when the background of the display area is made invisible by the electrochromic layer and the illuminance is equal to or larger than the second predetermined value, and the signal processing circuit is configured to set the adjustment coefficient based on brightness of the image to be displayed.

13. The display system according to claim 12, wherein the signal processing circuit is configured to monotonically increase the adjustment coefficient as the brightness of the image to be displayed decreases.

14. The display system according to claim 10, wherein the signal processing circuit is configured to output the second gradation values when the background of the display area is made visible and the illuminance is smaller than the second predetermined value or when the background of the display area is made invisible by the electrochromic layer and the illuminance is equal to or larger than the second predetermined value and when the minimum average value of pixel gradation values of respective colors included in the image to be displayed is equal to or larger than a third predetermined value.

15. The display system according to claim 14, wherein the signal processing circuit is configured to calculate, as a display image level, the minimum average value of the pixel gradation values of the respective colors included in the image to be displayed and set the adjustment coefficient based on the display image level.

16. The display system according to claim 15, wherein the signal processing circuit is configured to monotonically increase the adjustment coefficient as the display image level decreases.

17. The display system according to claim 10, wherein the signal processing circuit is configured to output, based on an attribute of the image to be displayed, the first gradation values or the second gradation values when the background of the display area is made visible and the illuminance is smaller than the second predetermined value or when the background of the display area is made invisible by the electrochromic layer and the illuminance is equal to or larger than the second predetermined value.

18. The display system according to claim 17, wherein the signal processing circuit is configured to set the adjustment coefficient based on the attribute of the image to be displayed.

* * * * *